United States Patent [19]

Zangrando

[11] 4,148,381
[45] Apr. 10, 1979

[54] CODED ACTUATOR

[75] Inventor: Roy A. Zangrando, Lake Hiawatha, N.J.

[73] Assignee: The United States of America as represented by the Secretary of the Army, Washington, D.C.

[21] Appl. No.: 756,518

[22] Filed: Jan. 3, 1977

[51] Int. Cl.² .................................... F16D 23/00
[52] U.S. Cl. ........................... 192/2; 74/113; 74/813 L
[58] Field of Search .............. 192/2; 74/813 R, 112, 74/113, 88, 813 L; 70/278

[56] References Cited

U.S. PATENT DOCUMENTS

| | | | |
|---|---|---|---|
| 2,491,595 | 12/1949 | Williams | 70/278 X |
| 2,881,621 | 4/1959 | Prendergast et al. | 74/88 X |
| 2,910,876 | 11/1959 | Jackson | 74/88 |
| 2,959,969 | 11/1960 | Leland et al. | 74/88 |
| 3,013,248 | 12/1961 | Carbonara et al. | 70/278 X |
| 3,073,995 | 1/1963 | Phinizy et al. | 74/88 X |
| 3,161,070 | 12/1964 | Venables | 74/88 X |
| 3,258,980 | 7/1966 | Swanson | 74/88 |
| 3,308,410 | 3/1967 | Biser | 74/88 X |
| 3,827,308 | 8/1974 | Brown | 74/88 |
| 4,038,846 | 8/1977 | Klann | 70/278 X |

FOREIGN PATENT DOCUMENTS

| | | | |
|---|---|---|---|
| 1179077 | 10/1964 | Fed. Rep. of Germany | 74/813 L |
| 1299479 | 7/1969 | Fed. Rep. of Germany | 74/88 |
| 1217202 | 12/1970 | United Kingdom | 74/813 L |

Primary Examiner—Leslie Braun
Attorney, Agent, or Firm—Nathan Edelberg; A. Victor Erkkila; Max Yarmovsky

[57] ABSTRACT

An electromechanical coded actuator, upon receipt of the proper combination of electrical pulses, will unlock and cause angular displacement of an output shaft. The device comprises a rotatable notched flange integral with the output shaft, the former being keyed to the housing by a series of flat blades axially movable against a bias. A first solenoid sequentially positions a rotatable index arm over each blade, whereupon a second solenoid actuates the index arm to displace and lock selected blades in a manner to align a notch in each blade with the flange. The latter is then free to be rotated via a clutch-type coupling with the first solenoid. Additional actuation of the rotary solenoid releases the clutch allowing the flange and shaft to be returned to its original position by a spring bias, and also releases the displaced blades to lock the flange. An electrical switch actuated by the index arm defines the zero position.

15 Claims, 12 Drawing Figures

FIG. I

CODED ACTUATOR

GOVERNMENTAL INTEREST

The invention described herein may be manufactured, used and licensed by or for the Government for governmental purposes without the payment to me of any royalty thereon.

BACKGROUND OF THE INVENTION

The increased emphasis on weapon system safety requires design characteristics that minimize the probability of functioning in accident environments and other circumstances other than the intended use. As part of this philosophy, a device is desired which will interrupt critical functional lines of the weapon and which can be operated only by a signal unique to the system. Previous interrupting devices did not possess this unique signal characteristic and could possibly function inadvertantly. Current devices are either inadequate in their uniqueness or are excessively complex and costly. The need therefore exists for a relatively simple device to actuate the aforementioned interrupter and which has an extremely low probability of being functioned at any time other than that intended.

SUMMARY OF THE INVENTION

The present invention relates to a coded actuator which provides an angular displacement of an output shaft upon receipt of a coded signal. Two solenoids each activated independently by a given combination of pulsed electrical signals align slots in locking blades, thereby releasing the output shaft and rotating it. Additional signals return the shaft and reset the locking blades.

An object of the present invention is to provide a new and improved coded actuator.

Another object of the invention is to provide mechanical actuation only upon receipt of an unique electrical signal.

Another object of the invention is to process the entire electrical signal before providing an mechanical output.

Another object of the invention is to provide a means of electrically resetting the device after actuation.

A further object of the invention is to provide a device which is compact and relatively small in size.

For a better understanding of the present invention, together with further objects thereof, reference is made to the following description taken in connection with the accompanying drawings.

BRIEF DESCRIPTION OF THE DRAWINGS

Throughout the following description, like reference numerals are used to denote like parts on the drawings.

DETAILED DESCRIPTION OF A PREFERRED EMBODIMENT

Figure 1:
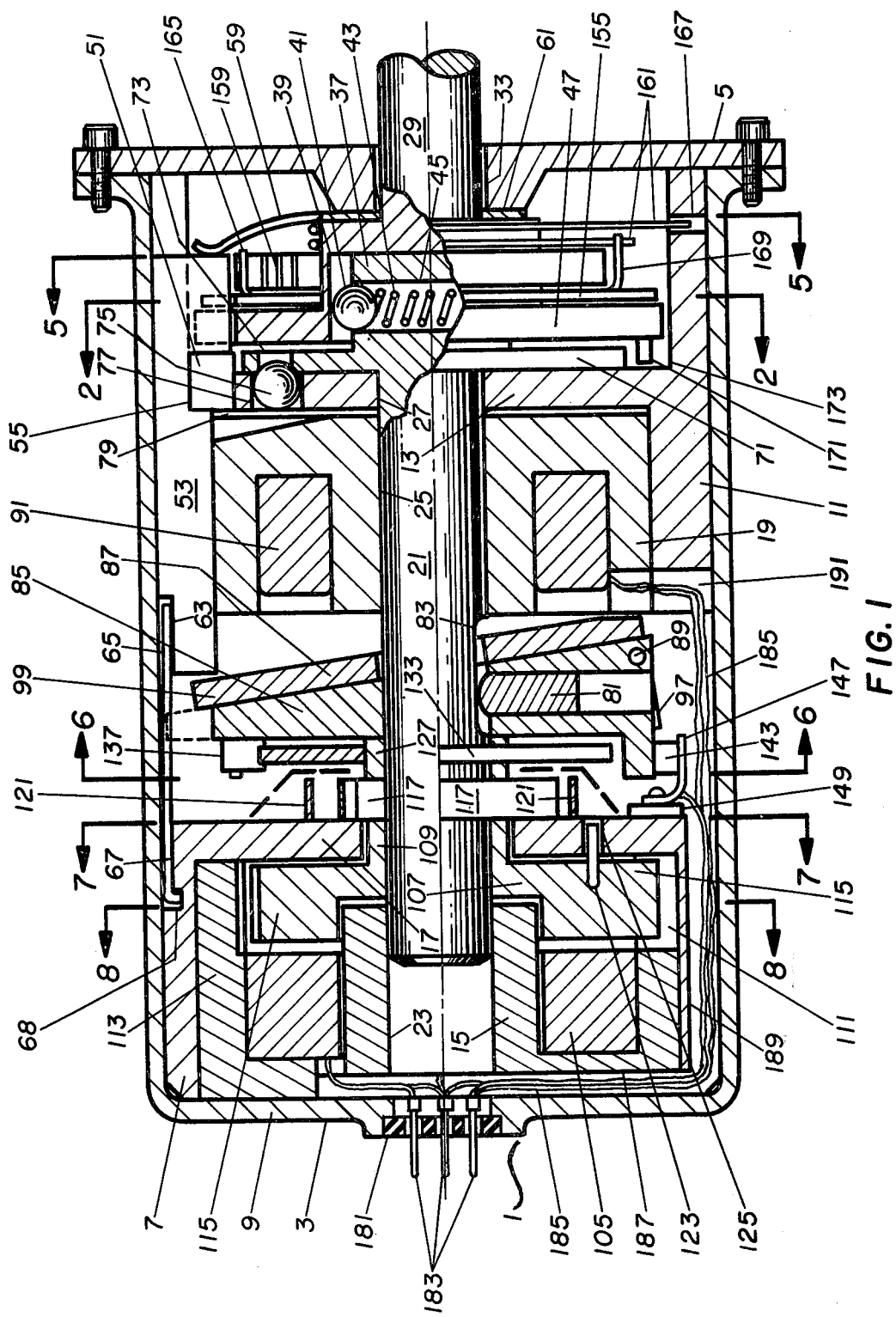
FIG. 1 is an axial section view of the device taken along line 1—1 of FIG. 7.

Referring to the drawings, particularly FIGS. 1-8, a coded electromechanical actuator 1 comprises a cup-shaped case 3 having its open end closed by a plate 5. A cup 7 is rigidly mounted in case 3 with its open end abutting the base 9 thereof. A cylindrical yoke 11, having an inwardly-extending flange 13, is rigidly mounted in the case 3 next to the plate 5. A first cylindrical magnetic core 15 is rigidly mounted within the cup 7, between its base 17 and the base 9 of the case 3. A second cylindrical magnetic core 19 is rigidly mounted within yoke 11, near the flange 13.

A cylindrical main or actuator shaft 21 is rotatably mounted in central bores 23, 25 and 27 in cores 15 and 19 flange 13, respectively. An output shaft 29, having an enlarged integral hub 31, is mounted for rotation in a central bore 33 of plate 5, in alignment with main shaft 21. Hub 31 has a central counterbore 35 that receives an enlarged end portion 37 of main shaft 21. The two shafts 21 and 29 are releasably connected together by a longitudinal half-circular groove 39 in the wall of counter bore 35 and a ball 41 and spring 43 mounted in a radial bore 45 in shaft end 37. Rotation of the main shaft 21 with the output shaft 29 stationary causes the ball 41 to ride on the surface of the bore 35 until the ball reaches the groove 39. When the ouput shaft is locked, as explained hereinafter, additional torque applied to the main shaft 21 forces the ball 41 back into the hole 45, thus permitting continued rotation of the main shaft. The hub 31 includes a radial flange 47 having a series, e.g. twelve, of radial notches 49 uniformly spaced around its periphery.

The periphery of the yoke 11 has a series of longitudinal grooves 51, with the same spacing as the notches 49 in flange 47, in each of which a locking blade 53 is slidably disposed for longitudinal movement into and out of the notches 49 of flange 47. As shown best in FIGS. 3A and 3B, each blade has a cut-out or notch 55 on its inner edge that clears the flange 47 in a first or "unlocking" position (FIG. 3B), and an adjacent solid portion 57 which enters the notch 49 in a second or "locking" position (FIG. 3A) to prevent rotation of the flange 47 and output shaft 29. When all of the blades are in the unlocking position, the flange 47 is free to be rotated by the main shaft 21.

Figure 4A:
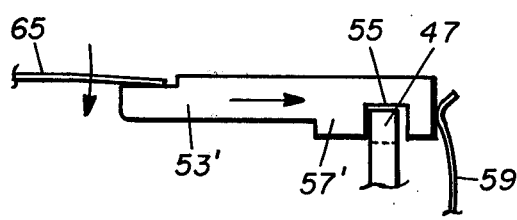
FIGS. 4A and 4B are similar illustrations of another blade type.
Figure 4B:
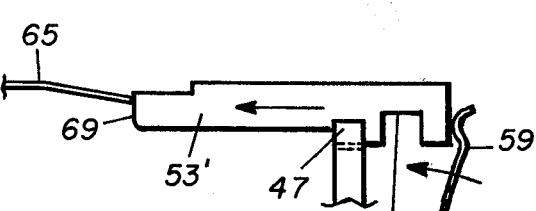

FIGS. 4A and 4B show a different form of blade 53' having a cut-out 55' and a solid portion 57' reversed in position from blade 53, which may be used in place of, or in any combination with, blade 53. The blades 53 and 53' may be termed "1" and "0" blades, respectively; and the positions shown in FIGS. 3A and 4A and in FIGS. 3B and 4B may be termed "0" and "1" positions, respectively. In order to unlock the flange 47, it is necessary to move all of the "1" blades into the "1" position and all of the "0" blades into the "0" position. Each blade 53 and 53' is biased to the "0" position by a leaf spring 59 extending radially from a central hub 61. In the "0" position, the outer edge 63 of each blade is resiliently engaged by the inner side of a spring clip 65 that extends from and is mounted in a recess 67 formed in the outer surface of cup 7. Each spring clip 65 has its left end (as seen in FIG. 1) bent inwardly into an annular recess 68 in the cup 7. Movement of each blade, against its bias spring 65, to the "1" position permits the other end of the clip 65 to move inwardly across the end edge 69 of the blade (FIGS. 3B and 4B), thereby holding the blade in the "1" position until it is released by other means.

From the foregoing it will be seen that a particular binary code is established, and that only by positioning the blades 53 and 53′ in accordance with that code can the output shaft 29 be unlocked.

A radial flange 71 on the main shaft 21 has a series of holes 73 around its periphery with the same spacing as the notches 49 of flange 47. A ball 75, mounted in a hole in yoke flange 13, is biased by a flat spring 79 into one of the holes 73, for resiliently detenting the main shaft 21 in each of its (twelve) angular positions.

Attached to main shaft 21, in a region next to core 19, by a set screw 81 engaging a flat 83 on the shaft, is an elongated index bar 85 having a circular armature plate 87 hinged thereto at one end by a pin 89. Armature plate 87 is so positioned adjacent to the magnetic core 19 that an electrical current in a first solenoid 91 mounted in the core causes the armature to be attracted toward the core. A spring 93 in a hole 95 in the index bar 85 applies force to a lever arm 97 on the armature plate 87 to bias the latter away from the core 19 in the absense of current in solenoid 91. A pawl 99 projects from the edge of the armature plate 87 diametrically opposite the hinge pin 89. The detenting of the main shaft 21 by ball 75 and holes 73 is such as to position the pawl 99 directly in front of each blade, whereby energizing the solenoid 91 causes the pawl to move the blade longitudinally from the "0" position to the "1" position.

Figure 6:
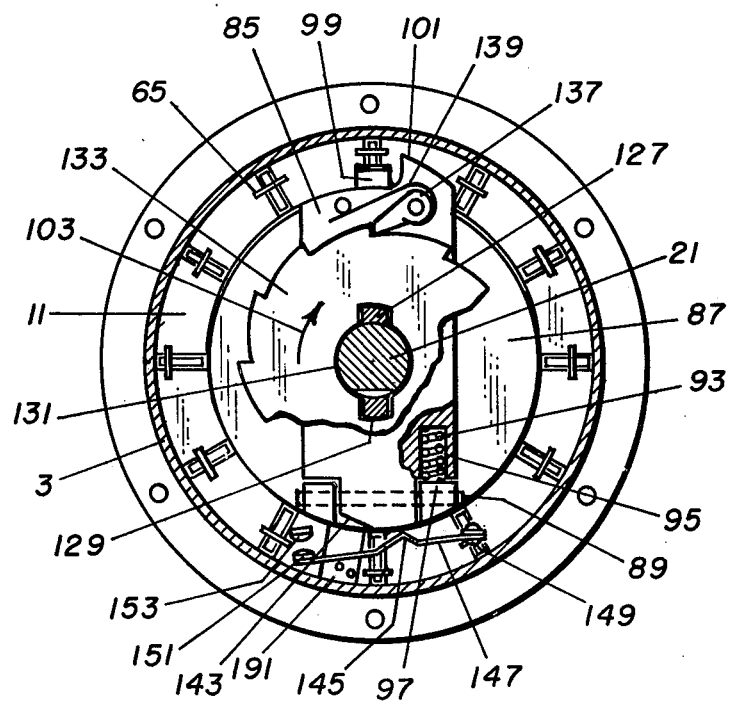
FIG. 6 is a transverse section view taken along line 6—6 of FIG. 1.

A first cam 101 projects from the index bar 85 in a region spaced slightly from the pawl 99, as shown in FIG. 6. As the index bar 85 rotates, with the main shaft, clockwise, as shown by the arrow 103 in FIG. 6, cam 101 sequentially lifts each clip 65, thereby allowing the corresponding blade 53 or 53′ to be reset by its spring 59 to the "0" position. Therefore, the blades 53 and 53′ can be set to the particular arrangement necessary to unlock the output shaft 29 by incremental rotation of the main shaft 21 to each of the detented positions, and either energizing or not energizing the solenoid 91 in each position as required by the particular permutation of the blades 53 and 53′, whereupon continued rotation of main shaft 21 will rotate the output shaft 29.

Figure 7:
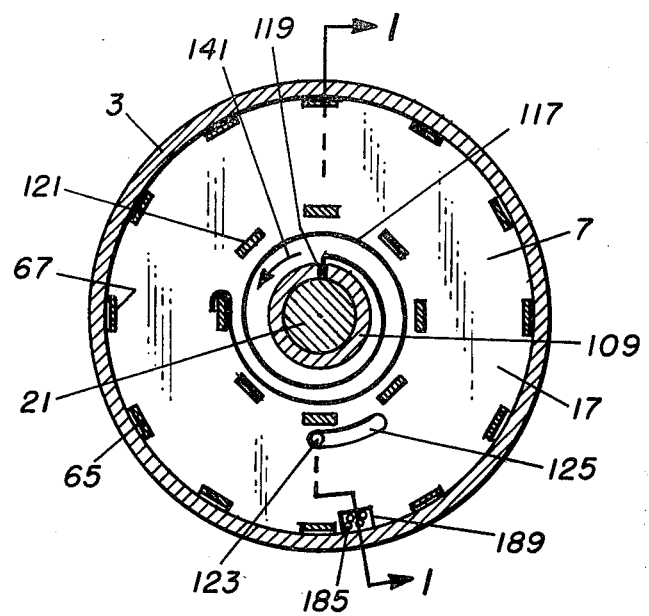
FIG. 7 is a transverse section view taken along line 7—7 of FIG. 1.
Figure 8:
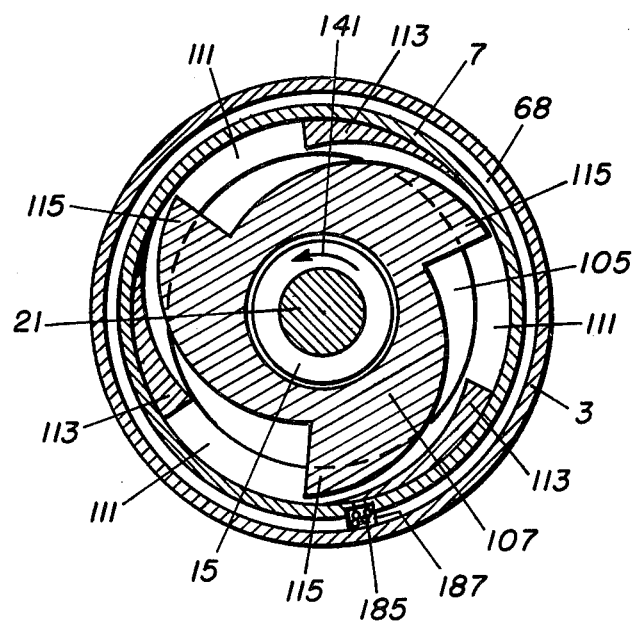
FIG. 8 is a transverse section view taken along line 8—8 of FIG. 1.

The main shaft 21 is rotated step-wise by means including the core 15, a second solenoid 105 mounted in core 15, and an armature 107 having a central collar 109 rotatable on the main shaft 21. The outer wall of the core 15 has three equally-spaced axial projections 113 and intermiate spaces 111 (FIG. 8). The armature 107 includes three equally-spaced radial projections 115, each having a gradually increasing radius, extending outwardly into the spaces 111 between the projections 113. The inner surfaces of the core projections 113 each have a concave curvature to conform to the curvature of the armature projections. The nature of the curvature is such that in any particular position of the armature 107 the perpendicular distance from any point on the curved surface of a core projection 113 to the curved surface of the corresponding armature projection 115 is constant. Projections 115 are disposed adjacent to the projections 113, but normaly angularly displaced therefrom by one step, e.g. 30° for twelve blades, by the bias of a coil spring 117 (FIG. 7). One end of spring 117 is inserted in a slit 119 in collar 109, and the other end is hooked over one of a series of axial prongs 121 mounted on cup 7 (FIG. 7). More than one prong 121 is provided for adjusting the tension of the spring 117. Rotation of the armature 107 relative to the core 15 is limited to one step by a pin 123 on the armature and a slot 125 in the base 17 of cup 7. The end of the armature collar 109 next to the index bar 85 has two splines 127 which engage two notches 129 in the central hole 131 of a ratchet wheel 133 having teeth 135 with the same spacing as the blades 53. A pawl 137, pivotally mounted on the index bar 85, is biased by a spring 139 into engagement with one of the teeth 135 (FIG. 6), to provide a unidirectional coupling between the armature 107 and the main shaft 21. The application of a pulse of electrical current to the solenoid 105 causes the projections 113 of core 15 to magnetically attract the angularly-displaced projections 115 on armature 107, and thereby rotate the armature against its spring 117, in the direction of the arrow 141, as limited by slot 125 and pin 123, or alternately by contact of the corresponding surfaces of the projections 113 and 115, through an angle corresponding to one step of the ratchet wheel 133. This one-step rotation of the armature 107 is transmitted by the splines 127 and notches 129 to the ratchet wheel 133, and by one of the teeth 135 and the pawl 137 to the main shaft 21. If all of the blades 53 and 53′ are in their unlocking positions, the output shaft 29 will also be rotated one step.

Means for orienting the index bar 85 to the proper starting, or "zero," position is provided by a second cam 143 on the end of the index bar opposite the first cam 101. In the zero position, shown in FIG. 6, the second cam 143 engages an intermediate portion 145 of a contact arm 147 that is attached at one end to an insulator 149 mounted on the cup 7. In the zero position of shaft 21, the cam 143 disengages the free end 151 of contact arm 147 from a second insulated contact 153 on cup 7. In all other positions, the circuit between contacts 147 and 153 remains closed.

Figure 2:
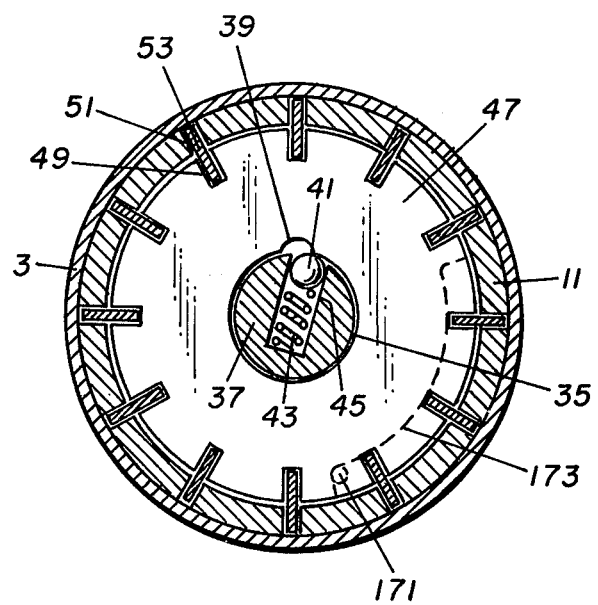
FIG. 2 is a transverse section view taken along line 2—2 of FIG. 1.
Figure 3A:
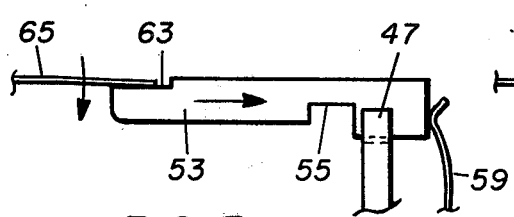
FIGS. 3A and 3B are illustrations of one blade type and its allowable positions relative to the code disc.
Figure 3B:
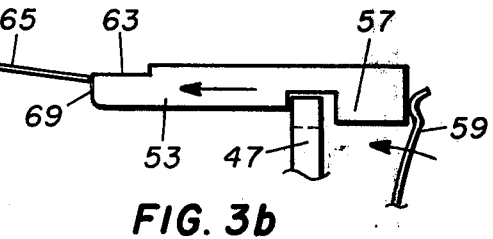
Figure 5:
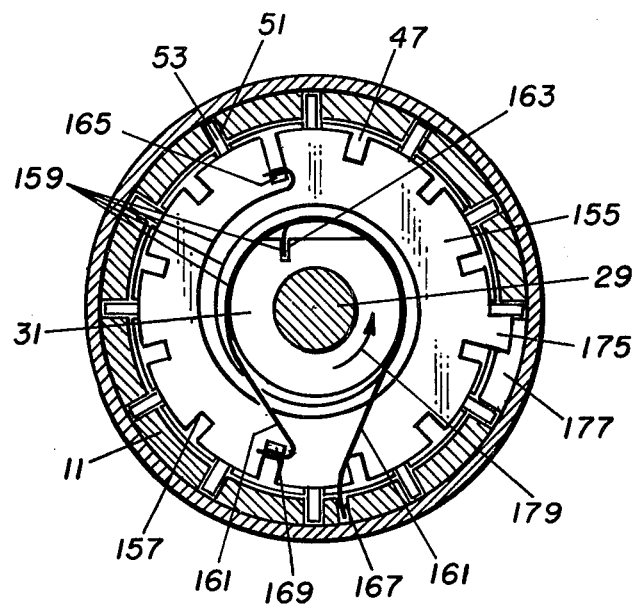
FIG. 5 is a transverse sectional view, taken along line 5—5 of FIG. 1, showing the device in the actuated state.

Referring now to FIGS. 1, 2 and 5 in particular, the hub 31 of output shaft 29 has an apertured disc 155 rotatable thereon adjacent to flange 47, the disc 155 having peripheral notches 157 similar to the notches 49 in flange 47. Relative angular movement between flange 47 and disc 155 is biased by a coil spring 159, while relative angular movement between flange 47 and yoke 11 is biased by a weaker coil spring 161. Spring 159 is connected between a slit 163 in hub 31 and an axial projection 165 on disc 155. Spring 161 is connected between a slit 167 on yoke 11 and an axial projection 169 on disc 155. The rotation of the flange 47, and hence, the output shaft 29, is limited by an axial pin 171 on flange 47 riding in an arcuate slot 173 in the yoke 11. The length of the slot 173 may be any selected number of steps of the main shaft 21, shown as three steps in FIG. 2. When the output shaft 29 is in its un-activated position, as shown by the position of pin 171 in FIG. 2, the notches 157 of disc 155 coincide with the notches 49 of flange 47. A tab 175 extending from the periphery of disc 155 and engaging a slot 177 in yoke 11 (FIG. 5) limits the rotation of disc 155 to an angle less than one step, and preferably a half-step.

After the flange 47 is unlocked, the main shaft 21 steps the flange 47 and repeatedly aligns the notches 49 of flange 47 with successive blades 53 and 53′ as the output shaft is rotated toward full activation, in the direction of the arrow 179 in FIG. 5. During each step, the first cam 101 releases any "1" blade in its path which, but for the disc 155, would enter the notch 49 of flange 47 and lock the flange in an intermediate position. However, the disc 155, having the weaker bias, rotates with flange 47 to the limit described, thereby blocking full return of the "1" blades to the "0" positions, thus permitting the flange 47 to continue unhampered to full actuation. During actuation of shaft 29, pin 171 reaches the limit of travel in slot 173 (e.g. three steps), preventing further rotation of flange 47. Further rotation of main shaft 21 disengages the coupling between the ball 41 and the groove 39. The spring 159 then returns the flange 47 to a half step from its original position wherein the notches 49 were aligned with the notches 157, whereupon the spring 161 takes over and rotates both disc 155 and flange 47 simultaneously to the original aligned position. Those "1" blades which were not released during the actuation of the output shaft 29 immediately enter the notches 49 and 157, thereby locking the flange 47. Further stepping of the main shaft to the zero position of the index bar 85, as determined by contact arm 147, will reset all "1" blades back to the "0" position, thus completing the locking procedure.

Figure 9:
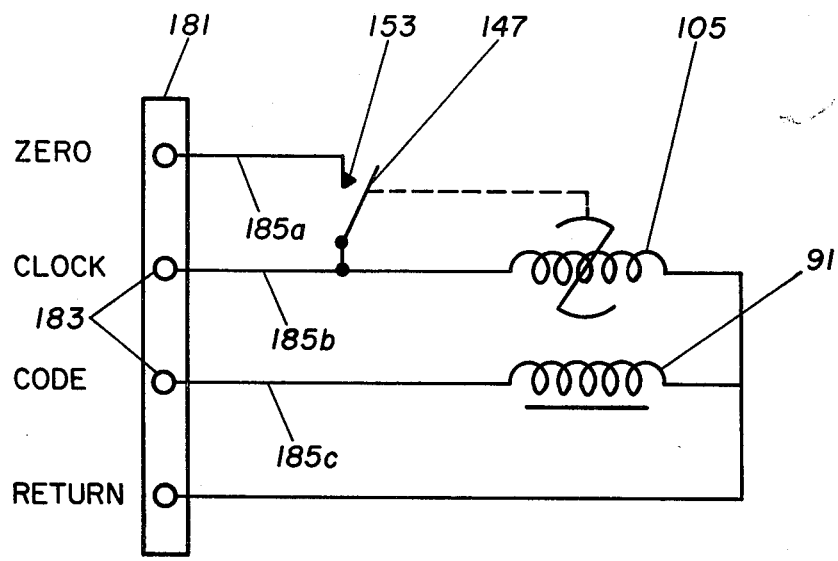
FIG. 9 is an electrical schematic of the device.
Figure 10:
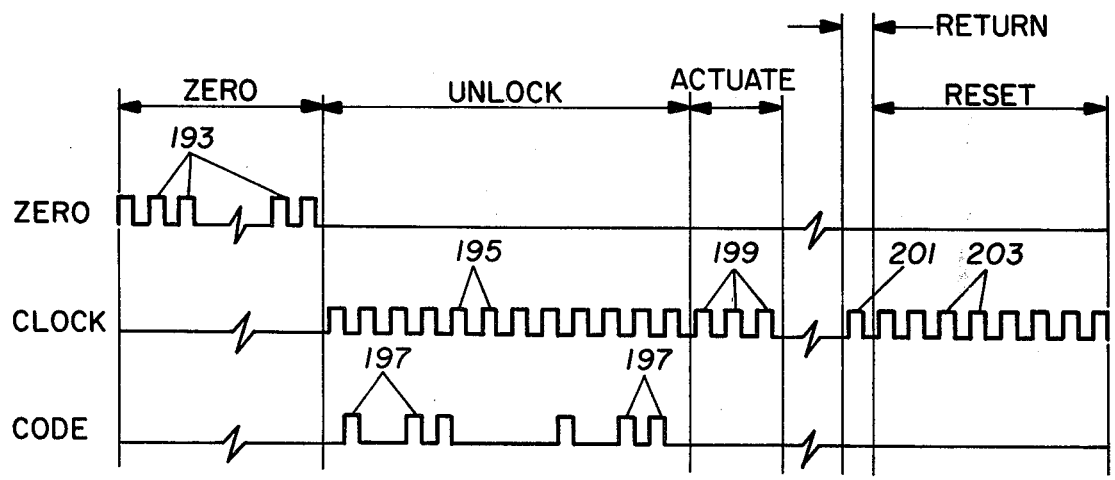
FIG. 10 is an illustration of the coded electrical signal required to operate the device.

Referring now to FIGS. 1, 9 and 10, a header 181 in base 3 includes a plurality of pins 183 having lines or leads 185 connected to contact arm 147, contact 153, solenoid 91 and solenoid 105. Clearance for leads 185 is provided by grooves 187 and 189 in cup 7 and 191 in yoke 11. As shown in FIG. 9, electrical access to solenoid 105 is provided both directly, from a "clock" pin 183 in the header, and through the contact arm 147 and contact 153, from a "zero" pin 183 in the header. The solenoid 91 is connected to a "code" pin 183 in the header. The circuit for each solenoid is completed through a return pin 183 in the header.

The electrical input to operate the actuator 1 comprises a series of electrical pulses applied to each of the "zero," "clock" and "code" lines, synchronized with respect to each other. A train of pulses 193 equal at least to the number of steps on the ratchet wheel 133 minus 1 (11 in the example given) is applied to the "zero" line 185a. If the index bar 85 should be in any but the "zero" position, the index bar will be stepped to the "zero" position, whereupon the contact arm 147 separates from contact 153, thereby preventing additional pulses from causing further stepping.

After zeroing the actuator, the unlocking function is effected by applying to the "clock" line 185b a train of pulses 195 exactly equal to the number of blades 53 and 53' in the actuator. The code pulse train is such that each pulse 195 of the clock train which causes the pawl 99 on armature plate 87 to be aligned with a "1" blade is followed immediately by a code pulse 197 applied to the "code" line 185c, to set this "1" blade in the "1" position, as shown in FIG. 10.

After entering the proper code as described to unlock the actuator, additional pulses 199 are applied to the clock line 185b, corresponding to the required rotation of the output shaft 29 (e.g. three pulses), to actuate the latter.

A single pulse 201 on the clock line 185b following the actuating pulses 199 is sufficient to return the output shaft 29 to its original unactuated position. Further pulses 203 on the clock line 185b are then necessary to "reset" the remainder of the blades to the "0" position. The number of these further pulses is equal to the total number of blades 53 and 53', minus the number of actuating pulses 199, minus one pulse 201 (return pulse). It should be noted that the "return" and "reset" pulses 201 and 203 can be applied to the "zero" line, to take advantage of the built-in zeroing feature. In addition, application of the train of pulses 193 to the "zero" line as part of the unlocking procedure is necessary only when application of the invention is such that uncertainty of the position of the index bar 85 exists.

Thus, there is provided an electromechanical coded actuator which will produce rotary motion of an output shaft upon the application of unique coded electrical signals, which can be reset electrically.

What is claimed is:

1. A coded actuator comprising:
   a housing;
   an output shaft mounted in one end of said housing for rotation, through at least a fraction of one complete turn, about a given axis; said shaft including a concentric disc-like radial flange having a predetermined number of locking notches equally spaced around its periphery;
   a like number of locking members each mounted in said housing for movement between two positions, one in and one out of locking engagment with one of said locking notches, in accordance with a desired code;
   an actuator shaft mounted in said housing for rotation about said axis, one end of said actuator shaft being adjacent to and detachably connected to said output shaft for rotating the latter when it is unlocked;
   means for resiliently detenting said actuator shaft in each of a like number of angular positions in each of which said locking members are aligned with said locking notches;
   means, including an arm pivoted on said actuator shaft and engageable with a different one of said locking members in each of said angular positions, for moving that locking member in one direction, into said one of said positions;
   resilient means constantly biasing said locking member in the direction opposite said one direction to the other of said positions; and
   means for rotating said actuator shaft step-wise, in one direction, from one angular position to the next.

2. A coded actuator as in claim 1, further comprising:
   a spring clip normally latching each of said locking members in said one position; and
   cam means on said arm for disengaging each of said clips from its locking member during the step-wise rotation of said actuator shaft, to permit movement of that locking member by its resilient means to said other position and subsequent movement thereof by said arm to said one position, if required by said code.

3. A coded actuator as in claim 1, wherein each of said locking members is formed with a cut-out arranged to be moved by said arm, against said resilient means, into unlocking relation with said flange, and an adjacent solid portion arranged to be moved by said resilient means into locking engagement with one of said notches.

4. A coded actuator as in claim 1, wherein each of said locking members is formed with a solid portion arranged to be moved by said arm into locking engagement with one of said notches, and an adjacent cut-out arranged to be moved by said resilient means into unlocking relation with said flange.

5. A coded actuator as in claim 1, wherein some of said locking members are formed with a clearance cut-out arranged to be moved by said arm, against said resilient means, into unlocking relation with said flange, and an adjacent solid portion arranged to be moved by said resilient means into locking engagement with one of said notches; and the remainder of said locking members are formed with a solid portion arranged to be moved by said arm into locking relation with one of said notches, and an adjacent clearance cut-out arranged to be moved by said resilient means into unlocking relation with said flange.

6. A coded actuator as in claim 1, wherein the detachable connection between said two shafts comprises:
 a cup-shaped hub portion on said output shaft, into which said one end of said actuator shaft extends, having a longitudinal internal groove of semi-circular shape; and
 a radial hole in said end containing a detent ball and a spring biasing said ball toward said groove.

7. A coded actuator as in claim 1, wherein said detenting means comprises:
 a like number of equally-spaced identical transverse holes in said output shaft flange;
 a second concentric disc-like radial flange on said actuator shaft adjacent to said output flange and having a single transverse hole larger than and arranged to be sequentially aligned with one of the first-named holes;
 a detent ball larger than said first-named holes, disposed in said single hole; and
 a spring biasing said ball partially into one of said first-named holes in each of said angular positions.

8. A coded actuator as in claim 1, wherein said arm is magnetic, and said means for moving the locking member further comprises an electromagnet including a magnetic core containing a solenoid and arranged to magnetically attract and move said arm in said one direction in response to an electrical signal applied to said solenoid.

9. A coded actuator as in claim 1, wherein said arm engages one end of said one locking member, and said resilient means comprises a spring resiliently engaging the opposite end of each locking member.

10. A coded actuator as in claim 1, wherein the last named means comprises:
 a transverse bracket attached to said actuator shaft;
 a ratchet wheel, having a like number of equally-spaced peripheral teeth, rotatable on said actuator shaft next to said bracket;
 a pawl pivoted to said bracket and engageable with each of said teeth in sequential order;
 an actuating member rotatably mounted on said actuator shaft and nonrotatably connected to said ratchet wheel;
 means for limiting the rotation of said actuating member and ratchet to one step as determined by the angle between two adjacent angular positions;
 means for rotating said actuating member in said one direction through said one step, to rotate said ratchet and actuator shaft to the next angular position; and
 spring means for returning said actuating member to its original position.

11. A coded actuator as in claim 10, wherein said means for rotating said actuating member comprises an electromagnet magnetically coupled to said actuating member.

12. A coded actuator as in claim 11, wherein said electromagnet is energized through a switch that is opened by a cam carried by said actuator shaft at one of said angular positions thereof, which establishes a starting or zero position of the actuator.

13. A coded actuator as in claim 11, wherein said electromagnet comprises: a magnetic core containing a solenoid and including a plurality of axial projections, and peripherally displaced initially therefrom by one step.

14. A coded actuator as in claim 13, wherein said arm is magnetic, and said means for moving the locking member further comprises an electromagnet including a magnetic core containing a second solenoid and arranged to magnetically attract said arm in said one direction in response to an electrical signal applied to said second solenoid.

15. A coded actuator as in claim 1, further comprising:
 a disc-like annular member rotatably mounted on said output shaft, adjacent to said radial flange, said annular member having equally-spaced peripheral notches aligned with said notches in said flange in one angular position thereof to receive said locking members;
 means limiting the rotation of said annular member relative to said housing to an angle less than one step;
 first spring means connected between said housing and said annular member for biasing the latter in the direction opposite said one direction; and
 stronger spring means connected between said output shaft and said annular member for biasing the latter in said one direction.

* * * * *